United States Patent
Zacek et al.

(10) Patent No.: US 9,261,873 B2
(45) Date of Patent: Feb. 16, 2016

(54) METHOD FOR POSITIONING AXES IN MACHINE TOOLS

(75) Inventors: Johann Zacek, Evenhausen (DE); Ludwig Buchner, Kienberg (DE)

(73) Assignee: DR. JOHANNES HEIDENHAIN GMBH, Traunreut (DE)

(*) Notice: Subject to any disclaimer, the term of this patent is extended or adjusted under 35 U.S.C. 154(b) by 1541 days.

(21) Appl. No.: 11/869,473

(22) Filed: Oct. 9, 2007

(65) Prior Publication Data

US 2008/0091296 A1  Apr. 17, 2008

(30) Foreign Application Priority Data

Oct. 14, 2006 (DE) .................. 10 2006 048 684

(51) Int. Cl.
G05B 19/41 (2006.01)
G05B 19/4103 (2006.01)
G05B 19/408 (2006.01)

(52) U.S. Cl.
CPC ........ *G05B 19/4086* (2013.01); *G05B 19/4103* (2013.01); *G05B 2219/33271* (2013.01); *G05B 2219/41176* (2013.01); *Y10T 409/300896* (2015.01); *Y10T 409/307672* (2015.01)

(58) Field of Classification Search
CPC ............... G05B 19/41; G05B 19/4103; G05B 19/4097; G05B 19/19; G05B 19/4086; G05B 19/182; G05B 19/4015; G05B 19/404; G05B 19/4093; G03F 7/70725
See application file for complete search history.

(56) References Cited

U.S. PATENT DOCUMENTS

| | | | | |
|---|---|---|---|---|
| 4,894,788 A * | 1/1990 | Stelzer | ........................... | 700/262 |
| 5,157,315 A * | 10/1992 | Miyake et al. | ............ | 318/568.11 |
| 5,255,571 A * | 10/1993 | Smith | ......................... | 74/490.06 |
| 5,341,289 A * | 8/1994 | Lee | ................. | 700/253 |
| 5,357,450 A | 10/1994 | Hemmerle et al. | | |
| 5,710,870 A * | 1/1998 | Ohm et al. | ..................... | 700/263 |
| 5,767,648 A * | 6/1998 | Morel et al. | ............... | 318/568.1 |
| 6,050,518 A * | 4/2000 | Ninet et al. | .................... | 242/436 |
| 6,185,493 B1 * | 2/2001 | Skinner et al. | .................. | 701/50 |
| 6,615,102 B1 * | 9/2003 | Morfino | ......................... | 700/173 |
| 7,299,108 B2 * | 11/2007 | Geissdorfer et al. | .......... | 700/188 |
| 7,530,878 B2 * | 5/2009 | Simakov et al. | .................. | 451/5 |
| 2002/0049514 A1 * | 4/2002 | Puchtler | ........................ | 700/245 |
| 2003/0060935 A1 * | 3/2003 | Puchtler | ........................ | 700/305 |
| 2008/0147238 A1 * | 6/2008 | Joly | ............................. | 700/260 |

FOREIGN PATENT DOCUMENTS

EP  0 289 836  11/1988
EP  1 189 121  3/2002

* cited by examiner

*Primary Examiner* — Kenneth M Lo
*Assistant Examiner* — Sunray R Chang
(74) *Attorney, Agent, or Firm* — Kenyon & Kenyon LLP

(57) ABSTRACT

In a method for positioning machine axes in machine tools, a numerical control converts setpoint positions of a tool, predefined in workpiece coordinates, into setpoint positions of machine axes based on a kinematic chain defined by a kinematic table. In this context, transformations of the coordinates are indicated in the kinematic table in a plurality of entries describing the kinematics of the machine tool, by specifying an axial direction and an associated transformation amount, respectively, per entry. For a machine axis having an error in a direction other than the respective axial direction, error transformation amounts dependent on the axial position are entered into the kinematic table.

15 Claims, 2 Drawing Sheets

| No. | Key | Axis | Delta | CompFile |
|---|---|---|---|---|
| 0 | Trans | Z | L | |
| 1 | Trans | X | | F_A_X(A) |
| 2 | Trans | B | | F_A_B(A) |
| 3 | MachAxis | A | | |
| 4 | Trans | X | L' | |
| 5 | Trans | Y | L" | |
| 6 | MachAxis | C | | |
| 7 | | | | |
| 8 | | | | |

10.1 → row 0
10.2 → row 1
10.3 → row 2
8.3 → F_A_X(A)

FIG. 2a

| | F_A_X(A) | |
|---|---|---|
| No. | Position | Compensation |
| 0 | 0 | F_A_X(0) |
| 1 | 10 | F_A_X(10) |
| 2 | 20 | F_A_X(20) |
| ... | ... | ... |
| 35 | 350 | F_A_X(350) |

| | F_A_B(A) | |
|---|---|---|
| No. | Position | Compensation |
| 0 | 0 | F_A_B(0) |
| 1 | 10 | F_A_B(10) |
| 2 | 20 | F_A_B(20) |
| ... | ... | ... |
| 35 | 350 | F_A_B(350) |

| No. | Key | Axis | Delta | CompFile |
|---|---|---|---|---|
| 0 | Trans | Z | L | |
| 1 | Trans | X | | F_A_X(A) |
| 2 | Trans | B | | F_A_B(A) |
| 3 | MachAxis | A | | |
| 4 | Trans | X | L' | |
| 5 | Trans | Y | L" | |
| 6 | MachAxis | C | | |
| 7 | | | | |
| 8 | | | | |

10.1 → (row 0)
10.2 → (row 1)
10.3 → (row 2)

— 8.3

METHOD FOR POSITIONING AXES IN MACHINE TOOLS

CROSS-REFERENCE TO RELATED APPLICATIONS

The present application claims priority to Application No. 10 2006 048 684.6, filed in the Federal Republic of Germany on Oct. 14, 2006, which is expressly incorporated herein in its entirety by reference thereto.

FIELD OF THE INVENTION

The present invention relates to a method for positioning machine axes in machine tools, which may provide for very precise positioning of the machine axes.

BACKGROUND INFORMATION

Ever greater demands with respect to machining accuracy are being placed on modern machine tools. Therefore, in controlling such machine tools using numerical controls, procedures must be put in place to avoid machining errors.

Reproducible deviations of the finished workpiece from the desired workpiece form often have their cause in the kinematics of the machine tool, which always exhibits certain errors. To eliminate such reproducible, static errors, European Published Patent Application No. 1 189 121 describes measuring the positioning error of a tool at a number of working points in a working space, and entering it in a multidimensional compensation table. The compensation values from the compensation table, interpolated as needed, are then applied to the setpoint positions of the tool predefined in workpiece coordinates in a machining program, the setpoint positions only then being transferred to the numerical control for positioning the tool. However, this method does not take into account that the static error of a machine tool may be a function of the position of certain machine axes, such as axes of rotation.

U.S. Pat. No. 5,357,450 describes that linear axes and their errors in machine tools are still comparatively easy to measure and adjust, while the errors due to axes of rotation or swivel axes cause a considerably higher expenditure for measuring and adjusting. U.S. Pat. No. 5,357,450 describes an automated method by which such errors may be measured and converted into instructions for maintenance operations.

A different approach may be taken according to European Patent No. 0 289 836, which describes a comparatively complex method for analyzing the errors in a robot mechanism and taking them into account by mathematical methods when positioning the robot.

In addition, it is conventional to describe the kinematics of a machine tool with the aid of a kinematic table. Based on such a kinematic table, a numerical control is able to convert the setpoint positions of a tool, predefined in workpiece coordinates, into setpoint positions of the machine axes. The machine tool is completely described with respect to its geometry and its machine axes in this kinematic table. Transformations of the coordinates are indicated in the kinematic table in a plurality of entries describing the kinematics of the machine tool, by specifying an axial direction and an associated transformation amount, respectively, per entry. The machine axes available are likewise specified at the corresponding places in the kinematic table. An example for such a kinematic table is described further below.

By converting the setpoint position of the tool (i.e., its tool center point, TCP, and its orientation), indicated in workpiece coordinates, into axial coordinates or axial positions of the machine tool, a parts program written in workpiece coordinates is able to be executed on different machine tools, provided they are able in principle to move to all desired tool positions.

SUMMARY

Example embodiments of the present invention provide a method for positioning machine axes in machine tools, by which it is possible to compensate for reproducible errors in the kinematics of the machine tool in a particularly easy manner.

Instead of using a compensation, acting on the setpoint values predefined in workpiece coordinates, with the aid of a compensation table as is conventional, the kinematic compensation of the various axial errors is performed in the kinematic table of a machine tool.

A method is provided for positioning machine axes in machine tools in which, based on a kinematic chain defined by a kinematic table, a numerical control converts setpoint positions of a tool predefined in workpiece coordinates, into setpoint positions of machine axes. In this context, transformations of the coordinates are indicated in the kinematic table in a plurality of entries describing the kinematics of the machine tool, by specifying an axial direction and an associated transformation amount, respectively, per entry. According to the method, for a machine axis having an error in a direction other than the respective axial direction, error transformation amounts which are a function of the axial position are provided in the kinematic table.

In this context, the error transformation amounts dependent on the axial position are available in the form of an axis-specific compensation table, which is referenced in the kinematic table. Such a compensation table includes error transformation amounts for a plurality of axial positions. Error transformation amounts for axial positions between the axial positions contained in the compensation table are interpolated as needed.

According to an example embodiment of the present invention, a method for positioning machine axes of a machine tool includes: converting, by a numerical control device, setpoint positions of a tool, predefined in workpiece coordinates, into setpoint positions of machine axes based on a kinematic chain defined by a kinematic table, transformations of the coordinates being provided in the kinematic table in a plurality of entries describing the kinematics of the machine tool, by specifying one axial direction and one associated transformation amount per entry. The kinematic table includes error transformation amounts dependent on an axial position for at least one machine axis having an error in a direction other than a respective axial direction.

The error transformation amounts dependent on the axial position may be provided in the form of an axis-specific compensation table which is referenced in the kinematic table.

The compensation table may include error transformation amounts for a plurality of axial positions.

The method may include, for axial positions for which the compensation table includes no error transformation amounts, interpolating the error transformation amounts.

The kinematic table may include error transformation amounts dependent on an axial position for a plurality of machine axes having an error in a direction other than the respective axial direction.

The kinematic table may include error transformation amounts dependent on an axial position for each machine axis having an error in a direction other than the respective axial direction.

According to an example embodiment of the present invention, a method for positioning machine axes of a machine tool includes: entering transformations of setpoint positions of a tool, predefined in workpiece coordinates, into setpoint positions of the machine axes into a kinematic table, the transformations of the coordinates indicated in the kinematic table in a plurality of entries describing kinematics of the machine tool by specifying one axial direction and one associated transformation amount per entry; for at least one machine axis having an error in a direction other than a respective axial direction, determining error transformation amounts dependent on an axial position; entering the error transformation amounts into the kinematic table; and converting, by a numerical control device, the setpoint positions of the tool into the setpoint positions of the machine axes based on a kinematic chain defined by the kinematic table.

According to an example embodiment of the present invention, a device for positioning machine axes of a machine tool includes: a numerical control device configured to convert setpoint positions of a tool, predefined in workpiece coordinates, into setpoint positions of machine axes based on a kinematic chain defined by a kinematic table, transformations of the coordinates being provided in the kinematic table in a plurality of entries describing the kinematics of the machine tool, by specifying one axial direction and one associated transformation amount per entry. The kinematic table includes error transformation amounts dependent on an axial position for at least one machine axis having an error in a direction other than a respective axial direction.

Further aspects and features of example embodiments of the present invention are described in more detail below with reference to the appended Figures.

BRIEF DESCRIPTION OF THE DRAWINGS

FIGS. 2a to 2c illustrate examples for compensation tables and a kinematic table.

DETAILED DESCRIPTION

Figure 1A:
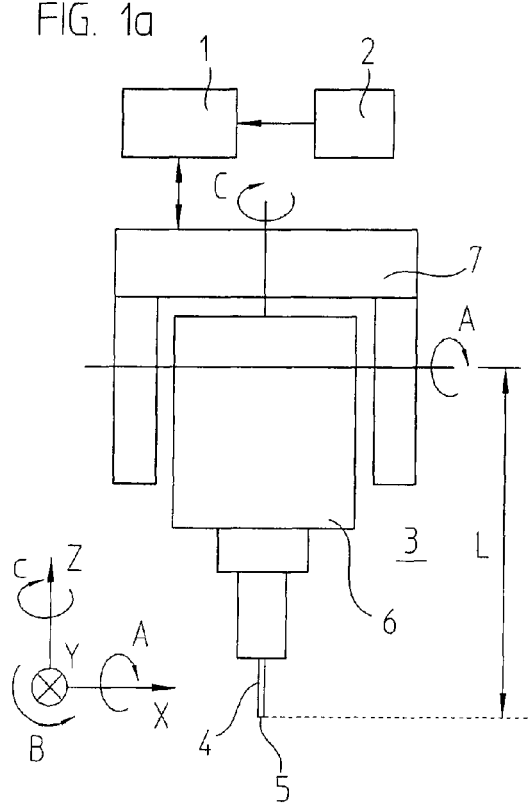
FIGS. 1a to 1d are several views illustrating a section of a machine tool.

Example embodiments of the present invention are described in greater detail below with reference to FIGS. 1a to 1C, which illustrate a section of a machine tool in various views and various states. It should be understood that the kinematics of this machine tool are merely exemplary and that example embodiments of the present invention may be applied to other kinematics.

A numerical control 1 having an NC program 2 written in workpiece coordinates (these elements are only shown in FIG. 1a, since this part of FIG. 1a would be unchanged in all views) is used for controlling a machine tool 3. In this context, the intention is to guide tool center point 5 (TCP 5) of a tool 4 on a predefined path, and to maintain a specific orientation of tool 4. For example, TCP 5 may be the spherical midpoint of a spherical cutter, or the midpoint of the end face of an end milling cutter.

For example, it is assumed that machine tool 3 is a five-axis milling machine, and therefore tool 4 is a milling cutter 4. This milling cutter is secured to an inclining head 6, which is held by two bearings of a fork 7. The inclining head 6 is therefore able to swivel about an axis A. Fork 7 is mounted in a manner allowing rotation about an axis C, so that two rotary degrees of freedom or machine axes A, C are represented in FIG. 1a. Three linear machine axes X, Y, Z, which allow translational movements of tool 4, are also provided. Machine tool 3 thus has a total of five machine axes X, Y, Z, A, C, whose directions are schematically illustrated in FIG. 1a.

X, Y, Z, A and C denote both the machine axes and the associated directions. B denotes only a direction of rotation since, as described further below, there is no corresponding machine axis in this example.

Figure 1B:
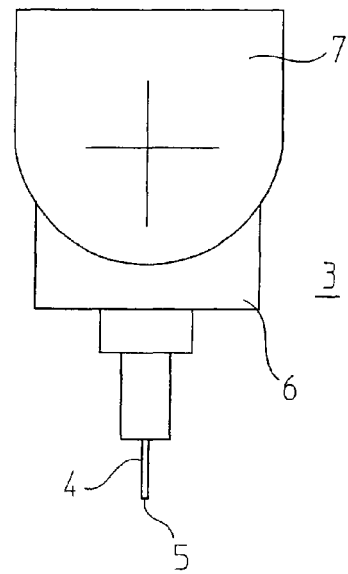

FIG. 1b is a lateral view of the machine tool illustrated in FIG. 1a. FIG. 1c shows the same view as FIG. 1a, however, in addition, inclining head 6 is illustrated as tilted about machine axis A, better seen in the lateral view of FIG. 1d.

Figure 1C:
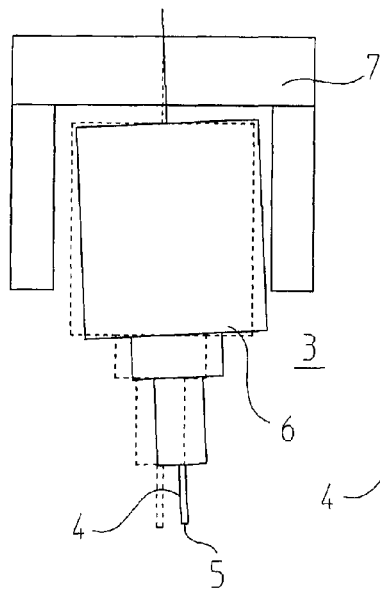
Figure 1D:
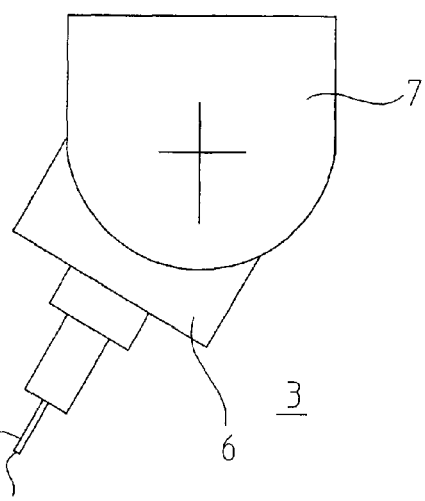

FIG. 1c illustrates that, in swiveling about machine axis A, inclining head 6 executes not only the movement actually desired, but in addition, a translational movement in the direction of machine axis X and a rotation in direction B. While there is no machine axis B in this example, due to faults in the mechanism, such a rotation may nevertheless occur.

It should be readily understood that the amount of the unwanted translational movement in the X direction and of the unwanted rotation in the B direction is a function of the angular position of machine axis A. In this connection, the relation between the swiveling angle of machine axis A and the translation and rotation amounts in X and B, respectively, is mostly non-linear.

FIGS. 2a and 2b show compensation tables 8.1 and 8.2, respectively, in which are entered error F_A_X(A) which, upon swiveling about the A axis, occurs in the X direction as a function of the position of machine axis A, and error F_A_B (A) which, upon swiveling about the A axis, occurs in the B direction as a function of the position of machine axis A, for several support points (angular positions of machine axis A).

For example, the error which, in the 0-degree position of machine axis A, occurs in direction X is F_A_X(0). The error which occurs in direction B in the 20-degree position of machine axis A is F_A_B(20).

The support points should be close enough together that intermediate values can be interpolated. The support points themselves are acquired by measurements, for example, using probes or other comparative measuring equipment. Compensation tables 8.1, 8.2 thus created are stored in numerical control 1 of machine tool 3. Compensation tables 8.1, 8.2 may only have to be determined once, for example, by the manufacturer of the machine tool, and may be used for all NC programs 2.

FIG. 2c illustrates a portion of kinematic table 9 of machine tool 3. Kinematic table 9 includes a plurality of lines having different entries. After the line number in the first column "No.", the type of entry is stated in the second column "Key". "Trans" denotes a fixed coordinate transformation within the kinematic chain, and "MachAxis" denotes a degree of freedom provided by a machine axis A, B, C, X, Y, Z.

Starting from TCP 5, kinematic table 9 thus represents a kinematic description of machine tool 3 in the form of a transformation chain, made up of fixed lengths (machine dimensions), variable lengths (linear axes), fixed rotations (machine conditions) and variable rotations (axes of rotation).

In each "Trans" line, usually the absolute value of the transformation, i.e., the transformation amount is in the column "Delta". In the example illustrated, the kinematic chain of machine tool 3 illustrated in FIGS. 1a to 1d is described starting from TCP 5 of tool 4. As can be deduced from FIG. 1, to convert workpiece coordinates into machine-axis coordinates, a displacement in the Z direction by the transformation amount L must be taken into account. The first entry 10.1 in kinematic table 9 in line 0 therefore reads: "transformation in Z direction by transformation amount L." That displacement L is usually split into a variable tool length and a fixed length based on the geometry of machine tool 3 plays no role. The variable length of tool 4 may be taken from a database of the tool stored within the control, and added to the fixed length to obtain L.

In an ideal machine tool, the next entry could read "MachAxis A", with which machine axis A, following the displacement by transformation amount L in direction Z, would be recorded in the kinematic chain or kinematic table 9. In the implementation of the coordinate transformation, at this point, the actual angular position of machine axis A should be taken into account.

Since, as illustrated in FIG. 1c and described above, this machine axis A is encumbered with errors that lead to further transformations, kinematic table 9 contains two additional entries 10.2, 10.3 in lines 1 and 2:

Line 1 describes a further transformation, this time in the X direction. The amount of this transformation is denoted as an error transformation amount, since it represents a variable based on an axial error.

This error transformation amount is entered in line 1 in the column "CompFile", and references compensation table F_A_X(A) shown in FIG. 2a. Thus, as a function of the angular position (or, more generally, the axial position) of machine axis A, different error transformation amounts may be taken into account in kinematic table 9 and therefore in the coordinate transformation.

The same holds true for line 2, in which for the error of machine axis A, error transformation amounts for direction B are acquired as a function of the angular position of machine axis A, by referencing table F_A_B(A) of FIG. 2b.

Machine axis A is entered in line 3. In kinematic table 9 of the present example, two further translational movements in X by L' and in Y by L" follow before the next machine axis C is entered. If machine axis C is also encumbered with errors that must be taken into account in kinematic table 9, then the corresponding translational movements should be entered using further lines, with reference to the suitable compensation tables, such as F_C_Z(C), for example, the error in direction Z dependent on the angular position in machine axis C.

The kinematics of any machine tool may be described in this manner, in so doing, it also being possible to take faulty linear axes into account by error transformation amounts dependent on the axial position and entered into the kinematic table.

Thus, the method described permits particularly easy compensation of faulty machine axes of a machine tool, and therefore a simple positioning of the machine axes so that the tool may be positioned with high accuracy as required.

What is claimed is:

1. A method for positioning machine axes of a machine tool, comprising:
converting, by a numerical control device, setpoint positions of a tool, predefined in workpiece coordinates, into setpoint positions of machine axes based on a kinematic chain defined by a kinematic table, each of the machine axes having a respective axial direction, transformations of the coordinates being provided in the kinematic table in a plurality of entries describing the kinematics of the machine tool;
wherein the kinematic table includes at least one first entry that specifies one respective axial direction and one associated transformation amount; and
wherein the kinematic table includes at least one second entry that specifies an error transformation amount in a first respective axial direction as a function of an axial position of the machine tool in a second respective axial direction, the first respective axial direction being different from the second respective axial direction.

2. The method according to claim 1, wherein the error transformation amount is provided in the form of an axis-specific compensation table which is referenced in the kinematic table.

3. The method according to claim 2, wherein the compensation table includes error transformation amounts for a plurality of axial positions.

4. The method according to claim 3, further comprising, for axial positions for which the compensation table includes no error transformation amounts, interpolating the error transformation amounts.

5. The method according to claim 1, wherein the kinematic table includes error transformation amounts for a plurality of machine axes.

6. A method for positioning machine axes of a machine tool, comprising:
entering transformations of setpoint positions of a tool, predefined in workpiece coordinates, into a kinematic table, each of the machine axes having a respective axial direction, the transformations of the coordinates indicated in the kinematic table in a plurality of entries describing kinematics of the machine tool, the kinematic table including at least one first entry that specifies one respective axial direction and one associated transformation amount;
determining an error transformation amount in a first respective axial direction dependent on an axial position of the machine tool in a second respective axial direction;
entering the error transformation amount into the kinematic table in at least one second entry that specifies the error transformation amount in the first respective axial direction as a function of the axial position of the machine tool in the second respective axial direction, the first respective axial direction being different from the second respective axial direction; and
converting, by a numerical control device, the setpoint positions of the tool into the setpoint positions of the machine axes based on a kinematic chain defined by the kinematic table.

7. The method according to claim 6, wherein the error transformation amount is provided in the form of an axis-specific compensation table which is referenced in the kinematic table.

8. The method according to claim 7, wherein the compensation table includes error transformation amounts for a plurality of axial positions.

9. The method according to claim 8, further comprising, for axial positions for which the compensation table includes no error transformation amounts, interpolating the error transformation amounts.

10. The method according to claim 6, wherein the kinematic table includes error transformation amounts for a plurality of machine axes.

11. A device for positioning machine axes of a machine tool, comprising:
a numerical control device configured to convert setpoint positions of a tool, predefined in workpiece coordinates, into setpoint positions of machine axes based on a kinematic chain defined by a kinematic table, each of the machine axes having a respective axial direction, transformations of the coordinates being provided in the kinematic table in a plurality of entries describing the kinematics of the machine tool;

wherein the kinematic table includes at least one first entry that specifies one respective axial direction and one associated transformation amount; and wherein the kinematic table includes at least one second entry that specifies an error transformation amount in a first respective axial direction as a function of an axial position of the machine tool in a second respective axial direction, the first respective axial direction being different from the second respective axial direction.

12. The device according to claim 11, wherein error transformation amounts dependent on the axial position are provided in the form of an axis-specific compensation table which is referenced in the kinematic table.

13. The device according to claim 12, wherein the compensation table includes error transformation amounts for a plurality of axial positions.

14. The device according to claim 13, wherein the numerical control device is configured to interpolate the error transformation amounts for axial positions for which the compensation table includes no error transformation amounts.

15. The device according to claim 11, wherein the kinematic table includes error transformation amounts for a plurality of machine axes.

* * * * *